US008903411B1

(12) United States Patent
Reeves et al.

(10) Patent No.: US 8,903,411 B1
(45) Date of Patent: Dec. 2, 2014

(54) APPLYING CALL EVENTS IN ASSOCIATION WITH USER DEVICES BASED ON PRIORITY LEVELS

(75) Inventors: Raymond Emilio Reeves, Olathe, KS (US); Simon Youngs, Overland Park, KS (US); Mark Douglas Peden, Olathe, KS (US); Piyush Jethwa, Overland Park, KS (US); Gary Duane Koller, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 853 days.

(21) Appl. No.: 12/829,876

(22) Filed: Jul. 2, 2010

(51) Int. Cl.
*H04W 72/00* (2009.01)
*H04B 1/06* (2006.01)

(52) U.S. Cl.
USPC ....................................... 455/452.2; 455/26.1

(58) Field of Classification Search
USPC ........... 455/452.1–452.2, 453, 26.1, 450, 451
See application file for complete search history.

(56) References Cited

U.S. PATENT DOCUMENTS

| | | | |
|---|---|---|---|
| 6,067,457 A * | 5/2000 | Erickson et al. | 455/512 |
| 6,628,637 B1 * | 9/2003 | Li et al. | 370/342 |
| 6,889,048 B1 * | 5/2005 | Koo | 455/452.1 |
| 7,206,593 B1 * | 4/2007 | Yarkosky et al. | 455/453 |
| 8,145,186 B1 * | 3/2012 | Vaughan | 455/452.2 |
| 2003/0096606 A1 * | 5/2003 | Inman et al. | 455/424 |
| 2005/0068920 A1 * | 3/2005 | Zhang | 370/329 |
| 2006/0007953 A1 * | 1/2006 | Vesma et al. | 370/466 |
| 2006/0221903 A1 * | 10/2006 | Kauranen et al. | 370/331 |
| 2008/0205290 A1 * | 8/2008 | Wille et al. | 370/252 |
| 2009/0275343 A1 * | 11/2009 | Monnes et al. | 455/453 |
| 2009/0285377 A1 * | 11/2009 | Sennett et al. | 379/201.04 |
| 2009/0318132 A1 * | 12/2009 | Chiou et al. | 455/423 |
| 2010/0113037 A1 * | 5/2010 | Ong et al. | 455/445 |
| 2010/0315968 A1 * | 12/2010 | Zhou et al. | 370/252 |
| 2011/0294456 A1 * | 12/2011 | Anderson et al. | 455/404.1 |

FOREIGN PATENT DOCUMENTS

EP   1432254 A1 *  6/2004

* cited by examiner

*Primary Examiner* — Christopher M Brandt (57) ABSTRACT

A method, system, and medium are provided for applying call events in association with user devices based on priority levels is provided. One embodiment of the method includes referencing an active event level associated with a user device. The active event level indicates an extent of call events, such as dropped calls and/or blocked calls, in association with the user device. When it is determined that the active event level is unacceptable, a priority level associated with the user device is adjusted based on the active event level to reconcile the unacceptable active event level.

20 Claims, 3 Drawing Sheets

APPLYING CALL EVENTS IN ASSOCIATION WITH USER DEVICES BASED ON PRIORITY LEVELS

SUMMARY

A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter. In brief, and at a high level, this disclosure describes, among other things, using priority levels to apply call events to user devices, or users in association therewith. In this regard, network resources are prioritized in accordance with a priority level of a user device relative to priority levels of other user devices utilizing or intending to utilize network resources.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended for the purpose of providing an easy methodology of communicating the ideas expressed herein and are not meant to limit the scope of the present invention. The following is a list of these acronyms:

3G Third-Generation Wireless Telephone Technology
4G Fourth-Generation Wireless Telephone Technology
CDMA Code Division Multiple Access
CD-ROM Compact Disk Read Only Memory
CRM Customer Relations Management
DVD Digital Versatile Discs
EEPROM Electrically Erasable Programmable Read Only Memory
GPRS General Packet Radio Service
GSM Global System for Mobile Communications
HLR Home Location Register
iDEN Integrated Digital Enhanced Network
MSC Mobile Serving Center
PC Personal Computer
PCS Personal Communications Service
PDA Personal Digital Assistant
RAM Random Access Memory
ROM Read Only Memory
SLA Service Level Agreement
TDMA Time Division Multiple Access
UMTS Universal Mobile Telecommunications Systems
VoIP Voice over IP
WiMAX Worldwide Interoperability for Microwave Access Further, various technical terms are used throughout this description. An illustrative resource that fleshes out various aspects of these terms can be found in Newton's Telecom Dictionary by H. Newton, $24^{th}$ Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the present invention are directed to applying call events in association with user devices, or users, based on priority levels. A call event, as used herein, refers to any event associated with a voice call that prevents, discontinues, or modifies a voice call. A call event may be a dropped call event or a blocked call event. A dropped call event or a dropped call refers to a voice call between at least two user devices that is dropped such that the devices are no longer in communication with one another. A blocked call event or a blocked call refers to a voice call attempt from one user device to at least one other user device that fails. In this regard, a successful connection between at least two user devices is not established.

A priority level refers to an extent, measure, order, degree, or position (e.g., in a graded scale) of a right to take precedence in association with a voice call. Accordingly, a user device associated with a high priority level has a greater right to take precedence in association with a voice call (i.e., utilize network resources) than a user device associated with a low priority level. In this regard, assuming multiple user devices have established calls and one of the calls needs to be dropped (e.g., a call associated with a high priority level or an emergency call is being made), the user device associated with the lowest priority level may be dropped. Similarly, in cases that multiple user devices are attempting to establish a voice call, the user device associated with the highest priority level may be initiated while the user devices having lower priority levels might be blocked from establishing voice calls.

Utilizing priority levels to determine call events to apply to user devices enables users of user devices, such as mobile devices, to realize an expected quality of service, such as a quality of service indicated in a service level agreement. Accordingly, customers paying less receive voice services in accordance with an amount paid relative to other customers. Customers paying more for services are provided voice services in accordance with an expected higher quality of service than customers paying a lower amount (e.g., a pre-paid subscriber or a basic level subscriber). This prevents low paying customers from having a higher quality voice service experience than high paying customers. In embodiments, applying call events based on priority levels additionally or alternatively enables control of voice service experiences such that customers are generally provided with a relatively typical voice service (e.g., a normal, typical, or average amount of dropped or blocked calls). In such embodiments, customers are prevented from having a relatively poor experience in comparison to other customers.

Accordingly, in one aspect, the present invention is directed to one or more computer-readable media having computer-useable instructions embodied thereon for performing a method of applying call events based on priority levels. The method includes referencing an active event level associated with a user device. The active event level indicates an extent of call events in association with the user device. The call events include one or more dropped calls, one or more blocked calls, or a combination thereof. The method also includes determining that the active event level is unacceptable. A priority level associated with the user device is adjusted based on the active event level to reconcile the unacceptable active event level.

In another aspect, the present invention is directed to one or more computer-readable media having computer-useable instructions embodied thereon for performing a method of applying call events based on priority levels. The method includes receiving call event indicators in association with a mobile device from a first set of service switches. The call event indicators provide an indication of dropped voice calls, blocked voice calls, or a combination thereof. An active event level is identified using the call event indicators that correspond with a predetermined time period. The active event level indicates an extent of call events in association with the user device within the predetermined time period. It is determined that the active event level exceeds one or more service experience boundaries. An adjusted priority level is determined to assign to the mobile device. The adjusted priority level is adjusted from a current priority level being used by a second set of service switches to prioritize mobile devices using network resources. The adjusted priority level is communicated such that a third set of service switches utilize the adjusted priority level to prioritize mobile devices using the network resources.

In yet another aspect, the present invention one or more computer-readable media having computer-useable instructions embodied thereon for performing a method of applying call events based on priority levels. The method includes referencing a set of priority levels. Each priority level is associated with a corresponding mobile device utilizing or initiating use of wireless network resources. The set of priority levels corresponding with mobile devices is utilized to select one or more mobile devices to which to apply a dropped voice call or a blocked voice call.

Figure 1:
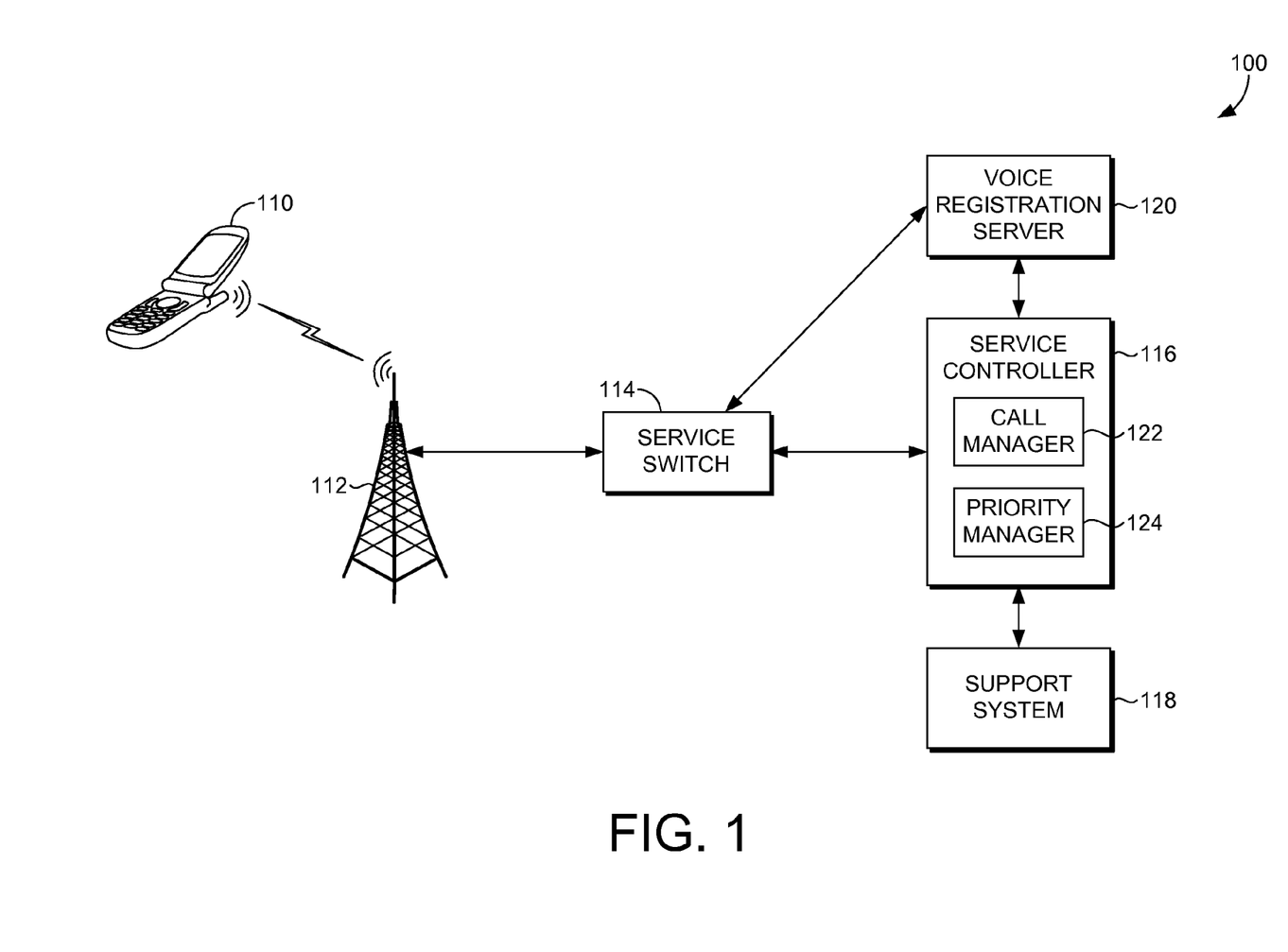
FIG. 1 is a block diagram of an exemplary computing system 100 that is suitable for operation of an embodiment of the present invention.

Referring to the drawings generally, and initially to FIG. 1 in particular, an exemplary computing system 100 for practicing an embodiment of the present invention is provided. It will be understood and appreciated by those of ordinary skill in the art that the computing system 100 shown in FIG. 1 is merely an example of one suitable computing system and is not intended to suggest any limitation as to the scope of use or functionality of the present invention. Neither should the computing system 100 be interpreted as having any dependency or requirement related to any single component or combination of components illustrated therein. The single unit depictions are meant for clarity, not to limit the scope of embodiments in any form. For example, although a single user device 110 and a single service switch 114 is illustrated, computing system 100 can include numerous user devices that communicate with one another and service switches, for example, geographically dispersed, that manage voice calls.

As shown in FIG. 1, an exemplary computing system 100 includes a user device 110, a transceiver 112, a service switch 114, a service controller 116, a support system 118, and a voice registration server 120. The user device 110, the service switch 114, the service controller 116, the support system 118, and the voice registration server 124 are capable of communicating via a communications network(s). A network(s) might comprise, for example, a cable network, the Internet, a wireless network (e.g., a wireless telecommunications network), or a combination thereof or portions thereof.

A wireless telecommunications network refers to any type of telecommunications network that is wireless. Examples of wireless telecommunications technologies include, but are not limited to, Global System for Mobile Communications (GSM), General Packet Radio Service (GPRS), Code Division Multiple Access (CDMA), CDMA2000, CDMAOne, Time Division Multiple Access (TDMA), Universal Mobile Telecommunications Systems (UMTS), Integrated Digital Enhanced Network (iDEN), WiMAX, 3G, 4G, and Personal Communications Service (PCS). A wireless telecommunications network might include an array of devices, which are not shown so as to not obscure more relevant aspects of the invention. Components such as a base station, a communications tower, or even access points (as well as other components) can provide wireless connectivity in some embodiments.

The user device 110 can be any electronic device having voice service capabilities, that is, a device capable of providing voice services. A user device may take on a variety of forms, such as a personal computer (PC), a laptop computer, a mobile phone, a personal digital assistant (PDA), or any other device that utilizes voice services as described herein. In embodiments, the user device 110 is a mobile device. Makers of illustrative devices include, for example, Research in Motion, Creative Technologies Corp., Samsung, Apple Computer, and the like. A mobile device can include, for example, a display(s), a power source(s) (e.g., a battery), a data store(s), a speaker(s), memory, a buffer(s), and the like. In embodiments, a mobile device comprises a wireless or mobile device with which a wireless telecommunications network is utilized for voice communication. Although illustrated as a mobile device, as can be appreciated, in other embodiments, a stationary device or a portable device (e.g., a landline laptop) can be used with which a network, such as the Internet and/or landline, is utilized for communication.

In the computing system 100 illustrated in FIG. 1, the user device 110 communicates by way of a wireless transceiver, depicted by numeral 112. A wireless transceiver serves as a transceiver for wireless communications between the user device 110 and a network. Examples of wireless transceivers include, but are not limited to, a base station transceiver and a Node B. Additional examples of wireless transceivers include Wi-Fi and WiMAX compatible transceivers. In embodiments, the wireless transceiver 112 is considered a component of a wireless telecommunications network to which the user device 110 communicates. Although illustrated in FIG. 1 as a user device 110 communicating via a wireless transceiver, as previously discussed, the user device 110 can communicate via a cable network, the Internet, etc.

The user device 110 communicates with other user devices, such as mobile devices or landline devices capable of communicating via voice services. In this regard, the user device 110 can establish a voice call with one or more landline devices, mobile devices, satellite devices, etc. A voice call or call refers to a connection over a telephone network (e.g., a wireless telecommunications network) between a source device (i.e., a user device that initiates a call), or user(s) in association therewith, and one or more destination devices (i.e., user devices to which the call is made), or user(s) in association therewith.

As previously described, voice calls initiated by a user device, such as user device 110, can be blocked resulting in a blocked call. A blocked call, as used herein, refers to an initiation or an attempt of a voice call that does not result in a successful connection or voice call. Upon establishing a voice call, such a call can be dropped (i.e., a dropped call). That is, a connection used for a voice call between user devices is lost such that the devices, and users thereof, are no longer in communication with one another.

The service switch 114 acts as a telephone exchange to handle communications activity. Accordingly, the service switch 114 can detect, recognize, and/or identify call events, such as dropped calls and/or blocked calls, that occur in association with a user device(s). In some embodiments, service switch 114 is a mobile serving center (MSC) that operates in association with CDMA wireless voice services. In other embodiments, the service switch 114 can operate in association with other voice services (e.g., GSM, VoIP, etc.).

Although a single service switch 114 is shown in FIG. 1, numerous service switches can be utilized to detect, recognize, and/or identify call events to allow data in association with a particular user device or a set of user devices to be collected throughout the network. In this regard, a call event in association with a mobile device that occurs in one location utilizing a particular service switch and another call event in association with the mobile device that occurs in another location can both be identified and, thereafter, utilized (e.g., to identify an active event level). Utilizing geographically dispersed service switches enables global enforcement of a voice service experience. As such, a user will be more likely to receive an expected or intended quality of service irrespective of the user device location and, thereby, less likely to receive great service in some locations while receiving poor service in other locations.

Service switch 114 can detect, identify, or recognize call event indicators that provide an indication of call events in association with mobile devices. A call event indicator might be, by way of example and not limitation, a call event type that indicates a type of call event (e.g., blocked call, dropped call, etc.), a call event time that indicates a time and/or date at which the call event occurred, a call event device that indicates one of more user devices with which the call event is associated (e.g., user device attempting to place a voice call), a call event user that indicates one or more users with which the call event is associated (e.g. user attempting to place a voice call), etc. The service switch 114 can provide or communicate call events, or indicators thereof, to the service controller 116.

In embodiments, the service controller 116 includes a call monitor 122 and a priority monitor 124. Although illustrated as two components, any number of components or modules can be used to perform the functions described herein. The call manager 122 is configured to manage call events in association with one or more user devices. The call manager 122 references call events, or indicators thereof (i.e., call event indicators). In embodiments, the call manager 122 receives, retrieves, accesses, obtains, etc. call events, or indicators thereof, from the service switch 114. Such data might be referenced upon a lapse of a predetermined time (e.g., hourly, daily, etc.), upon an occurrence of an event (e.g., a dropped call event, a blocked call event, a reception of an indication to update user profile, etc.).

The call event manager 122 associates call events with user devices, or users thereof, such that the call events can be stored in a user profile. Accordingly, a user profile includes data in association with a user or a user device including historical data regarding call events, such as dropped call events and/or blocked call events. In this regard, a user profile might include, by way of example and not limitation, a date and/or time at which a call event occurred, a type of call event, a device identifier in association with a call event (e.g., a device identifier associated with a dropped call), a location of a user device at the occurrence of a call event, etc. In some embodiments, the user profile includes an active event level, as described more fully below.

The priority manager 124 is configured to manage priority levels in association with user devices. As previously described, a priority level refers to an extent, measure, order, degree, or position of priority (e.g., in a graded scale) indicating a right to take precedence in association with a voice call. A priority level might be associated with dropped calls (i.e., a dropped priority level), blocked calls (i.e., blocked priority level), or a combination thereof.

In embodiments, the priority manager 124 identifies target priority levels in association with user devices, or users thereof. A target priority level, as used herein, refers a priority level desired or intended for a particular user device, or user in association therewith. In some cases, a target priority level for a user device or user might be identified, recognized, or selected based on a quality of service tier. In this regard, a high quality of service tier may result in a high target priority level. A quality of service tier provides an indication of a level of quality of service intended or desired to be provided to a user device, or user in association therewith. A quality of service or a quality of service tier can, in embodiments, be provided within a service level agreement (SLA) for a particular user. As a priority level can be a dropped priority level and/or a blocked priority level, a single quality of service tier might be provided or multiple quality of service tiers might be provided, for example, a quality of service tier for dropped calls and a separate quality of service tier for blocked calls. In some instances, a quality of service tier is provided to the service controller 116 via the support system 118. A support system, such as a backoff support system or a customer relations management (CRM), is a collection of enterprise systems (e.g., ordering, customer care, etc.) responsible for customer acquisition and management. As can be appreciated, in some cases, target priority levels are the same for each (or most) user device or user of a network service provider such that each user receives a comparable or similar quality of service.

Quality of service tiers and/or priority levels are associated with service experience boundaries. Service experience boundaries provide boundaries, limits, or thresholds that indicate a quality extent of voice service expected or intended to be provided to a user. Such service experience boundaries, in some cases, are included within a service level agreement in association with a user. In embodiments, service experience boundaries might be associated with a blocked call (i.e., a blocked call boundary), a dropped call (i.e., a dropped call boundary), or a combination thereof. As can be appreciated, such boundaries may be any boundary, limit, or threshold, including an upper boundary, a lower boundary, an average boundary, a median boundary, a combination thereof, etc. A boundary might be a numerical value including, for example, a target number of dropped and/or blocked calls, a target percent of dropped and/or blocked calls, a target range of dropped and/or blocked calls, a rate of blocked and/or dropped calls (e.g., a number of dropped/block calls within a particular time period), etc.

The priority manager 124 monitors call events. Such call events can be monitored, for example, in accordance with data provided by service switches, such as service switch 114, data stored within a user profile (e.g., a call event, one or more call event indicators, an active event level), and/or the like. In embodiments, previously occurring call events are monitored to recognize when an active event level of call events exceeds one or more service experience boundaries. That is, the priority manager 124 detects when an active event level of call events extends beyond a service experience boundary, such as dropping below a lower boundary or surpassing an upper boundary. An active event level refers to an indication of an extent of call events in association with a particular user device or user. An active event level may correspond with a predetermined period of time, such as one day, one week, one month, etc. Accordingly, the active event level might be a frequency, percent, rate, or the like of call events (e.g., dropped call events and/or blocked call events) that occur within the predetermined period of time for a particular user device or user. In this regard, the priority manager 124 detects and/or determines when voice services provided to the user device 110, or user in association therewith, exceed or fall short of service level boundaries in association with the quality of service tier and/or target priority level intended or expected for the user device 110 or user. In some cases, an active event level is determined and stored within the user profile, which can thereafter be referenced. In other cases, an active event level is determined based on data received by service switches and/or data within a user profile.

Upon detecting and/or determining failure to maintain previous call events within boundaries in association with a quality of service tier and/or a target priority level corresponding with the mobile device or user thereof, a priority level is modified or adjusted accordingly to reconcile or offset the excessive or lack of call events corresponding with the user device or user in association therewith. Stated differently, an adjusted priority level is assigned to or designated as a current priority level for a user device to utilize in applying call events to user devices. In this regard, upon recognizing that an active event level falls outside boundaries intended for a particular user device or user, an adjusted priority level is identified or selected. Such an adjusted priority level can then be used to determine to which user device(s) to apply a call event.

In one embodiment, a priority level is generally adjusted to a higher priority level (i.e., receive higher quality voice services) if an active event level falls below any service experience expectations. For example, assume that a high-value subscriber included within a high quality of service tier initially has a target priority level of 8 (e.g., on a scale from 1 to 10) and that such a quality of service tier and/or priority level is expected or intended to incur between 5 and 15 dropped calls or blocked calls within a one month time period. Further assume that the active event level for the subscriber is 20 indicating that the subscriber has incurred 20 dropped calls or blocked calls within the past month. In such a case, the priority level might be adjusted from the target priority level of 8 to an adjusted priority level of 10. The adjusted priority level can then be utilized to enable the user to receive better voice services (i.e., less blocked calls and less dropped calls as the user device is given a higher priority).

Conversely, a priority level is generally adjusted to a lower priority level (i.e., receive lower quality voice services) if an active event level exceeds any service experience expectations. For example, assume that a low-value subscriber included within a low quality of service tier initially has a target priority level of 3 (e.g., on a scale from 1 to 10) and that such a quality of service tier and/or priority level is expected or intended to incur between 20 and 30 dropped calls or blocked calls within a one month time period. Further assume that the active event level for the subscriber is 10 indicating that the subscriber has incurred 10 dropped calls or blocked calls within the past month. In such a case, the priority level might be adjusted from the target priority level of 3 to an adjusted priority level of 1. The adjusted priority level can then be utilized such that the user is prioritized in accordance with the adjusted priority level of 1 to offset the user's previous "excessive" voice services by increasing the likelihood of a call being dropped in favor of a higher priority subscriber.

As the active event level trends towards and/or achieves one or more service experience boundaries in association with a quality of service tier and/or a target priority level, the adjusted priority level can be adjusted in accordance therewith or reset to the target priority level. In this regard, the user begins receiving voice services as expected, for example, as indicated by a quality of service tier and/or service experience boundaries included in a service level agreement associated with the user. The service controller 116 can, in some embodiments, provide the support system 118 with notifications indicating that a user(s) exceeds service experience boundaries defined or associated with the user's quality of service tier and/or target priority level.

Current priority levels are communicated to the voice registration server 120. A current priority level refers to a priority level that is currently assigned to or designated for a particular user device, or user in association therewith. A current priority level can be, for instance, a target priority level or an adjusted priority level. By way of example only, initially, a current priority level designated for a user device is a target priority level or other default priority level, and such a priority level can be provided to the voice registration server 120. Assume that at a later time, the service controller 116 adjusts the priority level to accommodate for an active event level that deviates from service experience boundaries. In such a case, the current priority level at which to utilize in applying call events is the adjusted priority level.

The current priority level can be determined and/or communicated to the voice registration server, for example, upon a lapse of a time period, upon an occurrence of an event (e.g., upon modifying the priority level, upon a user device attempt to establish a call, etc.). The current priority level can be stored in association with the voice registration server. In embodiments, a voice registration server comprises or includes a home location register (HLR). An HLR is a database used to identify and verify a user and maintain user information, e.g., user details related to features and services. The voice registration server 120 may be associated with a particular service switch 114, as illustrated in FIG. 1, integrated with the service switch 114, or alternatively may service multiple service switches.

The voice registration server 120 provides the current priority level in association with a user device or user to one or more service switches, such as service switch 114. The current priority level can be communicated to a service switch(s), for example, upon a lapse of a time period, upon an occurrence of an event (e.g., upon modifying the priority level, upon a user device attempt to establish a call, etc.).

The service switch 114 utilizes current priority levels in association with user devices, or users thereof, to apply call events to one or more user devices or users. That is, service switches apply a call event(s) to a user device(s) based on current priority levels corresponding with a set of user devices. In one embodiment, the serving switch 114 accesses the voice registration server 120 when necessary to reference or obtain current priority levels for user devices such that the serving switch 114 can determine a call event to apply to one or more user devices. In another embodiment, the voice registration server 120 provides current priority levels to the serving switch 114 such that the serving switch 114 can utilize the current priority level to determine or select one or more user devices to which to apply a call event. In such an embodiment, such current priority levels may be stored at the service switch 114, among other service switches.

To determine or select a user device for which a call event is to be applied, the service switch 114 can compare priority levels of user devices. Accordingly, a user device associated with a higher priority level relative to priority levels of other user devices being served by a service switch or using network resources may be given priority of quality voice services such that less voice calls are blocked and/or dropped. Conversely, a user device associated with a lower priority level relative to priority levels of other user devices being served by a service switch or using network resources may be given a lower priority of quality of voice services such that voice calls are more likely dropped and/or blocked.

By way of example only, assume that a particular service switch is serving a plethora of user devices and that voice services can only be provided to one additional user device. Further assume that two user devices are attempting to establish a voice call (e.g., simultaneously or within a predetermined time span). In such a case, the service switch can recognize the priority level of each of the two user devices that initiated a voice call and select the user device associated with the higher priority level to establish a voice call. Accordingly, a blocked call is applied to the voice call initiated by the user device associated with the lower priority such that a voice call is not established. Now assume that the two user devices attempting to establish a voice call are both associated with an equally high priority level. In such a case, the service switch might recognize the high priority levels of the two user devices that initiated a voice call and select to drop a voice call already established by another user device having a lower priority level so that both voice calls initiated can be established. In such a case, a dropped call is applied to the voice call established by the user device associated with the lower priority.

As can be appreciated, the service switch 114 can also be configured to consider emergency calls, or other voice calls indicated as high priority. In such a case, even if the service switch 114 would typically drop or block a voice call based on a priority level of a user device relative to other priority levels, such a call may be allowed if it is determined the voice call is an emergency call (e.g., a call placed or established with 911 or used by emergency authority).

Figure 2:
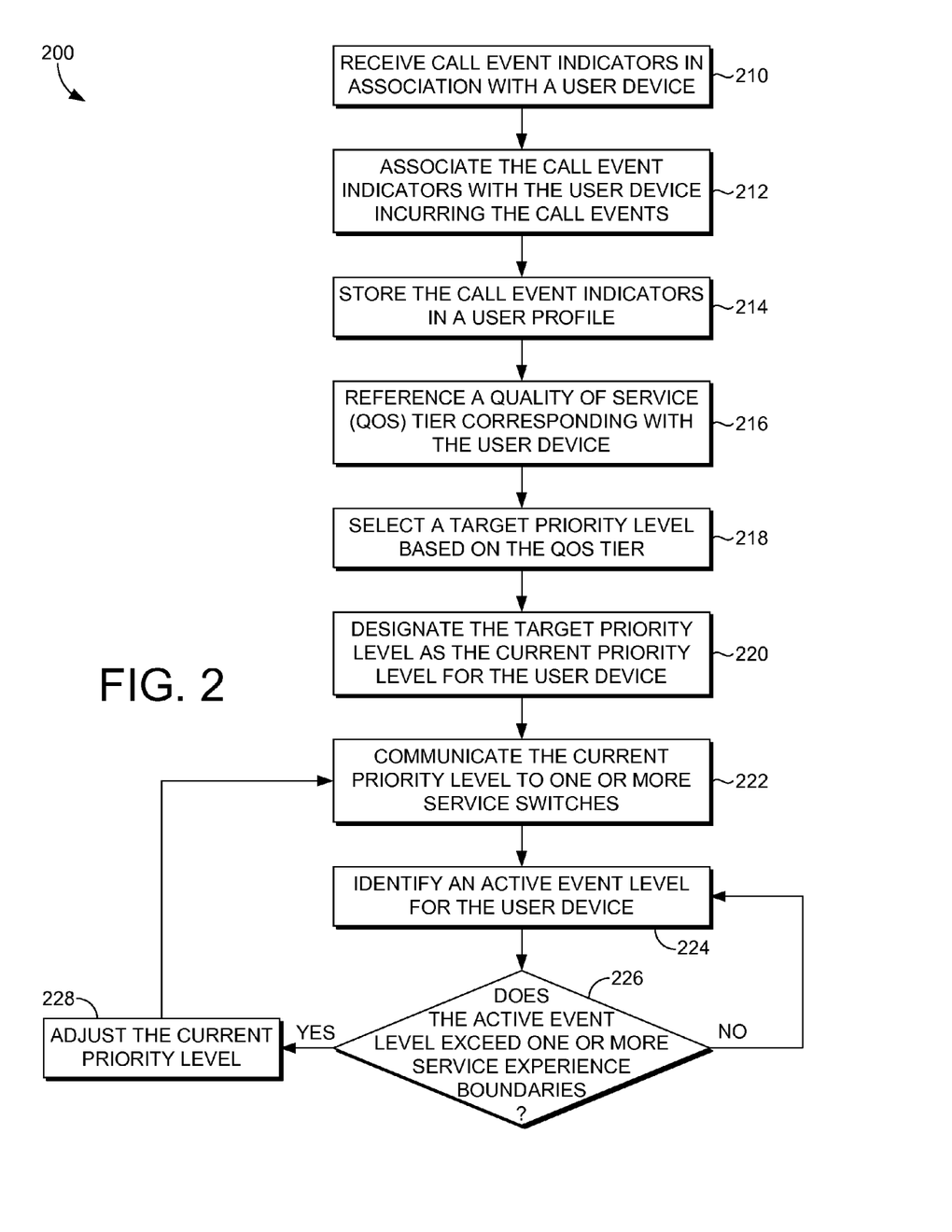
FIG. 2 provides an exemplary flow diagram illustrating a method for managing call events and priority levels, in accordance with an embodiment of the present invention.

By way of example only, and with reference to FIG. 2, an exemplary method 200 for managing call events and priority levels is provided. In embodiments, a service controller, such as service controller 116 can perform such a method. Initially, as indicated at block 210, call event indicators in association with a user device are received. Such call event indicators provide an indication of details of call events incurred by a user device. At block 212, the call event indicators are associated with the user device incurring the call events. The call event indicators, or a portion thereof, are stored in a user profile for a user or user device. This is indicated at block 214.

At block 216, a quality of service tier corresponding with the user device is referenced. A quality of service tier can, in some embodiments, be provided from a support system. Such a quality of service tier might be indicated in a service level agreement. Subsequently, at block 218, a target priority level is selected based on the quality of service tier. At block 220, the target priority level is initially designated as the current priority level for the user device. At block 222, the current priority level is communicated to one or more service switches, for example, via a voice registration server. At block 224, an active event level for the user device is identified. The active event level describes the frequency, rate, or percent of call events (e.g., dropped calls, blocked calls, or a combination thereof) that have occurred prior to a particular time or within a particular time period. In this regard, a frequency of dropped calls that have occurred within the past month might be determined. An active event level can be identified, for example, using data within a user profile. At block 226, it is determined if the active event level exceeds one or more service experience boundaries associated with the quality of service tier and/or a current priority level (i.e., the target priority level) of the user device. If the active event level does not exceed one or more service experience boundaries associated with the quality of service tier and/or a current priority level of the user device, the method continues to block 224 at which an active event level for the user device is identified. Such an identification can be performed continuously, upon a lapse of a time, upon an occurrence of an event, etc.

If, on the other hand, the active event level does exceed one or more service experience boundaries associated with the quality of service tier and/or a current priority level of the user device, at block 228, the priority level is adjusted to result in an adjusted priority level that is designated as the current priority level. The method returns to block 222 at which the adjusted current priority level is communicated to one or more service switches, for example, via a voice registration server.

Figure 3:
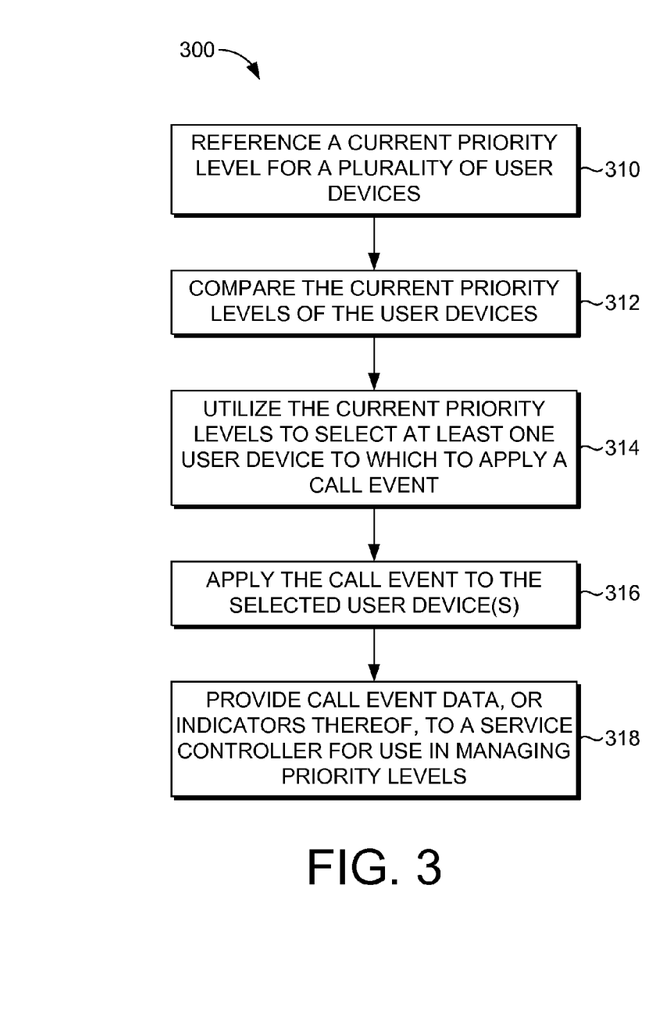
FIG. 3 provides an exemplary flow diagram illustrating a method for applying call events in association with user devices based on priority levels, in accordance with an embodiment of the present invention.

Turning to FIG. 3, an exemplary method for applying call events in association with user devices based on priority levels is provided. In embodiments, a service switch, such as service switch 114, can perform such a method. Initially, as indicated at block 310, a current priority level is referenced for a plurality of user devices utilizing network resources or desiring to utilize network resources, or a particular portion thereof. In some cases, current priority levels are referenced upon detecting that a call event pertaining to one or more user devices utilizing, or intending to utilize, network resources is necessary. A current priority level is the priority level currently assigned to, identified as, or designate for a user device. In some case, a current priority level may be a target priority level. In other cases, a current priority level may be an adjusted priority level adjusted due to an active event level of the user device exceeding a corresponding service experience boundary. At block 312, the current priority levels for the one or more user devices are compared. At block 314, the current priority levels are utilized to select at least one user device to which to apply a call event, such as a dropped call or a blocked call. In this regard, user devices associated with lower current priority levels are selected or designated to receive a call event (e.g., a dropped call or a blocked call) such that user devices associated with higher current priority levels can establish and/or maintain a voice call. The call event is applied to the selected at least one user device, as indicated at block 316. That is, a voice call initiated by a selected user device is blocked or a voice call established by a selected user device is dropped. At block 318, the call event applied to the at least one user device, or indicators thereof, is provided to a service controller, such as service controller 116 of FIG. 1, for use in managing priority levels.

Figure 4:
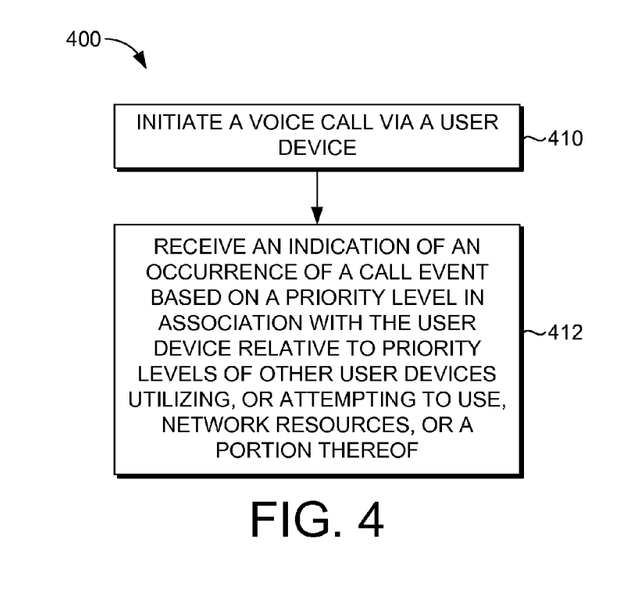
FIG. 4 illustrates an exemplary method for receiving an indication of a call event based on priority levels, in accordance with an embodiment of the present invention.

Turning now FIG. 4, an exemplary method for receiving an indication of call events based on priority levels is provided. Initially, at block 410, a voice call is initiated. In some cases, the voice call is established with one or more user devices. Subsequently, at block 412, an indication of a call event is received. Such an indication of an occurrence of a call event might be a voice call that is blocked and, as such, does not result in an established connection. Alternatively, an indication of a call event might be a voice call that is dropped and, thereby, eliminates an established voice call. The call event is based on a priority level associated with the user device compared to priority levels associated with other user devices utilizing network resources, or attempting to use network resources, or a portion thereof.

It will be understood by those of ordinary skill in the art that the order of steps shown in the method 200 of FIG. 2, method 300 of FIG. 3, and method 400 of FIG. 4 are not meant to limit the scope of the present invention in any way and, in fact, the steps may occur in a variety of different sequences within embodiments hereof. For example, with respect to FIG. 2, in cases that the active event level does not exceed one or more service experience boundaries such that the priority level is not adjusted, the maintained current priority level can be communicated to one or more service switches. In another example, the identified active event level can be stored in the user profile. Any and all such variations, and any combination thereof, are contemplated to be within the scope of embodiments of the present invention.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. For example, not all steps listed in the various figures need be carried out or need to be carried out in the specific order described.

The invention claimed is:

1. One or more non-transitory computer-readable media having computer-useable instructions embodied thereon for performing a method of applying call events based on priority levels, the method comprising:
   referencing an active event level associated with a user device, the active event level indicating an extent of call events in association with the user device, wherein the call events comprise one or more dropped calls, one or more blocked calls, or a combination thereof applied to the user device by one or more network devices;
   determining that the active event level for the user device is unacceptable based on the active event level falling outside a boundary specific to the user device; and
   adjusting a priority level assigned to the user device, based on the active event level falling outside the boundary specific to the user device, wherein the adjusted priority level comprises an extent of a priority associated with dropping or blocking voice calls for the user device, the adjusted priority level being used by the one or more network devices to drop calls and/or block calls associated with the user device.

2. The media of claim 1 further comprising referencing the priority level associated with the user device.

3. The media of claim 1 further comprising communicating the adjusted priority level to one or more service switches for use in prioritizing user devices in association with a call event.

4. The media of claim 1, wherein determining that the active event level is unacceptable comprises comparing the active event level with one or more service experience boundaries to determine if the active event level exceeds any of the one or more service experience boundaries.

5. The media of claim 4, wherein the priority level is based on a quality of service tier associated with the user device.

6. The media of claim 5, wherein the one or more service experience boundaries are associated with the quality of service tier, the priority level, or a combination thereof.

7. The media of claim 1 further comprising designating the adjusted priority level as the current priority level for the user device.

8. One or more non-transitory computer-readable media having computer-useable instructions embodied thereon for performing a method of applying call events based on priority levels, the method comprising:
   receiving call event indicators associated with a mobile device from a first set of one or more service switches associated with a network, the call event indicators providing an indication of one or more dropped voice calls, one or more blocked voice calls, or a combination thereof applied to the mobile device by the one or more service switches;
   identifying an active event level using the call event indicators that correspond with a predetermined time period, the active event level indicating an extent of call events associated with the mobile device within the predetermined time period;
   determining that the active event level exceeds one or more service experience boundaries associated with the mobile device;
   based on the active event level exceeding the one or more service experience boundaries associated with the mobile device, determining an adjusted priority level to assign to the mobile device, the adjusted priority level being adjusted from a current priority level being used by a second set of one or more service switches associated with the network to prioritize mobile devices using network resources, wherein the adjusted priority level comprises an extent of a priority associated with dropping or blocking voice calls for the mobile device; and
   communicating the adjusted priority level such that a third set of one or more service switches associated with the network utilize the adjusted priority level to prioritize mobile devices using the network resources.

9. The media of claim 8, wherein the active event level is stored in a user profile for use in determining that the active event level exceeds the one or more service experience boundaries.

10. The media of claim 8 further comprising:
identifying a target priority level for the mobile device based on a quality of service tier corresponding with the mobile device; and
designating the target priority level as the current priority level.

11. The media of claim 10, wherein the one or more service experience boundaries correspond with the target priority level, the quality of service tier, or a combination thereof.

12. The media of claim 11, wherein the quality of service tier is indicated in a service level agreement with a user of the mobile device.

13. The media of claim 8, wherein the current priority level is based on a previously adjusted priority level.

14. The media of claim 13, wherein the adjusted priority level is determined to be a target priority level for the mobile device that corresponds with a quality of service tier associated with the mobile device.

15. The media of claim 8, wherein the adjusted priority level is greater than the current priority level when it is determined that the active event level falls below a lower service experience boundary such that the mobile device receives fewer dropped calls, blocked calls, or a combination thereof.

16. The media of claim 8, wherein the adjusted priority level is less than the current priority level when it is determined that the active event level is greater than an upper service experience boundary such that the mobile device receives more dropped calls, blocked calls, or a combination thereof.

17. One or more non-transitory computer-readable media having computer-useable instructions embodied thereon for performing a method of applying call events based on priority levels, the method comprising:
at a network device, referencing a set of priority levels, each of the priority levels assigned to a corresponding mobile device utilizing or initiating use of wireless network resources, wherein at least one priority level associated with a mobile device is an adjusted priority level that has been adjusted up or down from an original priority level for the mobile device indicating an extent of preference to associate with dropping or blocking voice calls for the mobile device by one or more network devices to compensate for an extent of blocked calls, dropped calls, or a combination thereof exceeding or falling short of an expected service level boundary associated with the original priority level for the mobile device; and
at the network device, utilizing the set of priority levels corresponding with mobile devices to select one or more mobile devices to which to apply a dropped voice call or a blocked voice call.

18. The media of claim 17 further comprising recognizing that the wireless network resources are at or are approaching capacity.

19. The media of claim 17, wherein the voice call is a non-emergency voice call.

20. The media of claim 17, wherein each of the priority levels indicates an extent of priority to be given to the corresponding user device, wherein a higher priority level results in a higher quality of services being provided to the user of the user device.

* * * * *